No. 894,282. PATENTED JULY 28, 1908.
M. W. NEUENS.
HAND TRUCK.
APPLICATION FILED MAR. 22, 1906.
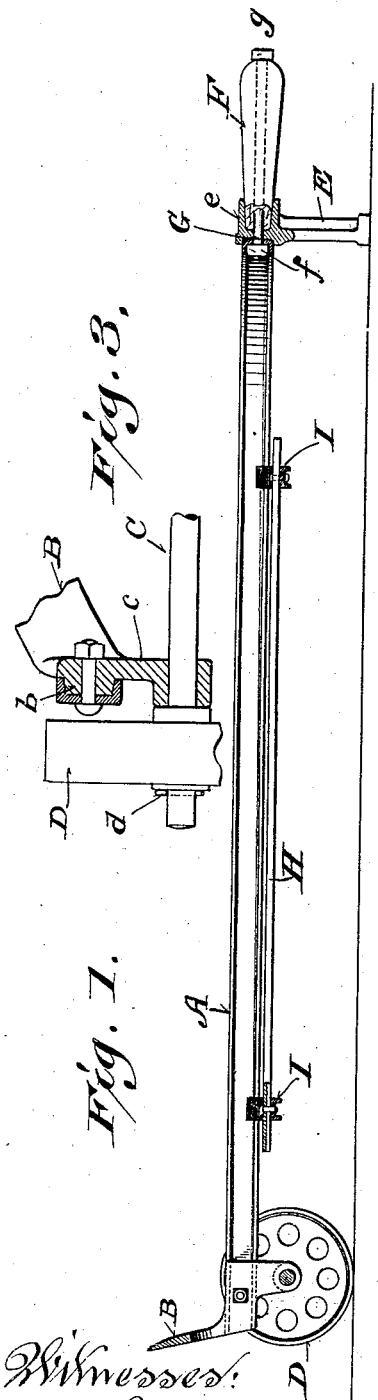
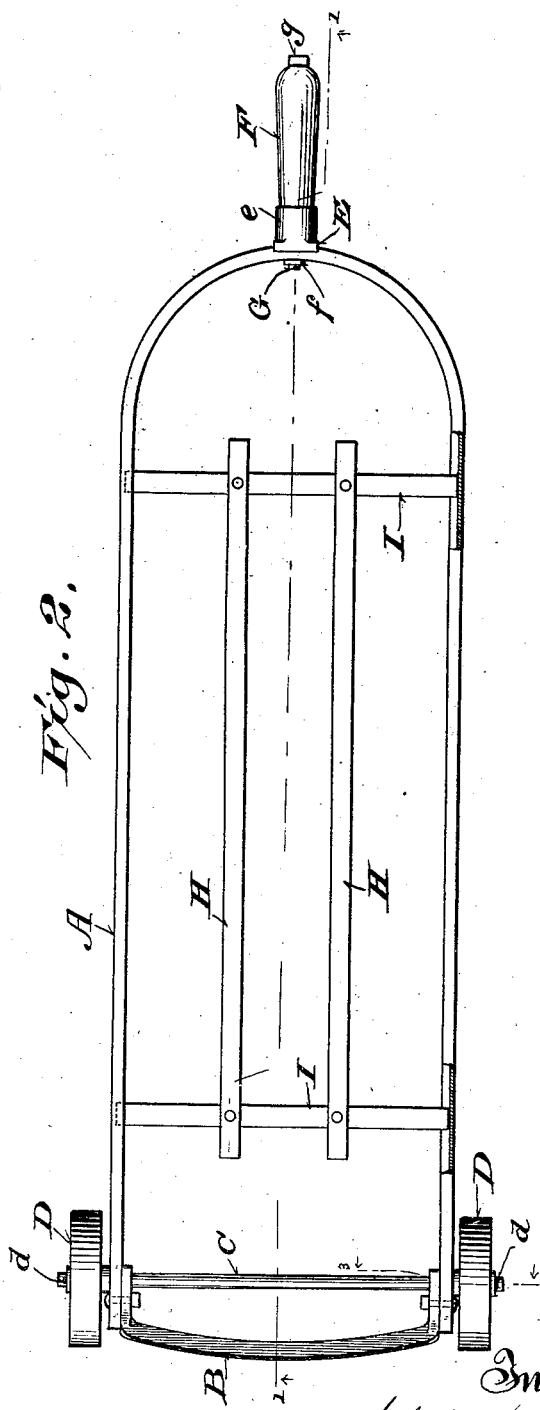

UNITED STATES PATENT OFFICE.

MICHAEL W. NEUENS, OF PORT WASHINGTON, WISCONSIN, ASSIGNOR TO WESTERN IMPLEMENT COMPANY, OF PORT WASHINGTON, WISCONSIN.

HAND-TRUCK.

No. 894,282.     Specification of Letters Patent.     Patented July 28, 1908.

Application filed March 22, 1906. Serial No. 307,378.

*To all whom it may concern:*

Be it known that I, MICHAEL W. NEUENS, a citizen of the United States, and resident of Port Washington, in the county of Ozaukee and State of Wisconsin, have invented certain new and useful Improvements in Hand-Trucks; and I do hereby declare that the following is a full, clear, and exact description thereof.

My invention consists in certain peculiarities of construction and combination of parts herein shown, described and claimed; its object being to provide simple, strong, light, durable and economical knockdown hand-trucks, and rack-attachments for the same, particular reference being had to the accompanying drawings in which:

Figure 1 represents a vertical longitudinal section view of a hand-truck in accordance with my invention, this view being indicated by lines 1—1 in the next figure of the series; Fig. 2, a plan view of the truck partly broken, and Fig. 3, a sectional view of a fragment of said truck, this view being indicated by lines 3—3 in Fig. 2.

Referring by letter to the drawings, A indicates a strip of channel-iron or steel suitably bent in the form of a yoke and connected at its ends to a preferably arched bar B of cast-metal. The bar B has right-angle rearwardly extending ends each provided with an outer lateral lug $b$ fitting the channel of an end of the bent strip aforesaid, and said bar is bolted through its ends to those of the strip. Depending from the ends of the bar are hangers $c$ for an axle C, and wheels D are held, by linch-pins $d$, on the axle. The bent strip A and detachable bar B constitute the frame of the truck, and a cast-metal leg E has angular fit upon said strip central of the rear of said frame. The leg is provided with a socket $e$ for a handle F, and a bolt G extends through the handle into a nut $f$ caught in the channel of the frame aforesaid. The head $g$ of the bolt is angular and exposed back of the handle to be engaged by a wrench when it is desirable to tighten or loosen said bolt.

In detachable engagement with the frame of the truck is a grating or rack consisting of longitudinal members H and transverse members I pivotally connected at their intersections. The transverse members of the grating are preferably bowed and concave side uppermost, their ends being engaged with the channel of the frame-strip A aforesaid. All the members of the grating are preferably strips of channel-iron or steel. To remove the grating from the frame of the truck, its transverse members are swung out of horizontal position to an angle sufficient to obtain a clearance of their ends from the channel of said frame.

The truck above specified is practically all metal, its handle being preferably of wood, although it may be of any other suitable material, and said truck is particularly designed with reference to knockdown shipment and storage of the same singly or in lots, no skilled labor or special tools being required in its assembly. In comparison with its strength and durability, the truck is very light and it can be manufactured to sell at an unusually low price as compared to trucks of the ordinary construction.

I claim:—

A hand-truck comprising a suitably bent channel strip of metal, a metal bar having lateral end lugs fitting the channel of the strip at the ends of the same, bolts connecting the ends of said strip and bar, an axle for which the bar is provided with hangers, a nut engaging the channel of the aforesaid strip at the rear of same, a leg casting having angular fit on said strip and provided with a socket, a handle engaging the socket, and a suitable bolt extending through the handle into said nut.

In testimony that I claim the foregoing I have hereunto set my hand at Port Washington in the county of Ozaukee, and State of Wisconsin in the presence of two witnesses.

MICHAEL W. NEUENS.

Witnesses:
   HARRY VAN DER VOORT,
   CLARENCE HILL.